United States Patent

[11] 3,599,902

[72] Inventor John W. Thomley
3050 N. Brett Ave., Decatur, Ill. 62526
[21] Appl. No. 849,685
[22] Filed Aug. 13, 1969
[45] Patented Aug. 17, 1971

[54] AIRCRAFT
2 Claims, 7 Drawing Figs.

[52] U.S. Cl. .................................................. 244/12, 244/43, 244/123
[51] Int. Cl. ....................................................... B64c 29/00
[50] Field of Search .......................................... 244/12, 23, 123, 43; 60/261

[56] References Cited
UNITED STATES PATENTS

| | | | |
|---|---|---|---|
| 2,713,393 | 7/1955 | Isacco | 244/43 |
| 2,743,072 | 4/1956 | Emmi | 244/43 |
| 3,065,938 | 11/1962 | Calkins | 244/43 |
| 3,497,163 | 2/1970 | Wakefield | 244/43 |
| 3,184,187 | 5/1965 | Isaac | 244/123 |
| 3,437,290 | 4/1969 | Norman | 244/23 |
| 3,465,525 | 9/1969 | Cowley et al. | 60/261 |
| 3,469,804 | 9/1969 | Rowan | 244/12 |

Primary Examiner—Milton Buchler
Assistant Examiner—Steven W. Weinrieb
Attorney—Ralph W. Kalish ABSTRACT: An aircraft having a fuselage of generally saucerlike character comprising upper and lower disc components separated by a transverse spacing; said upper component being contoured to provide an aerodynamic surface and merging into an upwardly projecting dome which comprises a portion of the pilot compartment. The maximum diameter of said upper component being substantially equivalent to three times the linear distance between the lower face of said spacing and the uppermost point of said dome. Depending from the lower fuselage section is a motor with a swivelly mounted afterburner for controlling the direction of horizontal flight. Provided within said spacing for rotation about an axis normal to the vertical axis of said aircraft are jet motors and airfoils for controlling vertical flight.

PATENTED AUG 17 1971  3,599,902

INVENTOR
JOHN W. THOMLEY
BY Ralph W. Kalish
ATTORNEY

INVENTOR
JOHN W. THOMLEY
BY Ralph W. Kalish
ATTORNEY

AIRCRAFT

BACKGROUND AND SUMMARY OF THE INVENTION

This invention relates in general to aircraft and, more particularly, to a jet-propelled aircraft of general saucerlike design adapted for both horizontal and vertical flight. It is an object of the present invention to provide aircraft of the jet propulsion type incorporating a compact, so-called saucerlike fuselage and having retractable airfoils for takeoff and vertical flight purposes.

It is a further object of the present invention to provide an aircraft of the type stated incorporating a fuselage having critical dimensional characteristics for conducing to a level of operating efficiency heretofore unknown in aircraft of generally related contour. It is a further object of the present invention to provide an aircraft of the type stated incorporating a fuselage having an upper portion with a predetermined camber to produce unusual lift characteristics, whereby a low-pressure area or vacuum is created over substantially the entire upper surface of the craft with resultant lift ability to an extent hitherto unknown.

It is another object of the present invention to provide an aircraft of the type stated involving novel and easily manipulated means for directing the craft in horizontal flight.

It is a still further object of the present invention to provide an aircraft of the jet propulsion type which may be most economically manufactured; which is extremely efficient and low cost in operation; which, by reason of its unique structure, is stable in flight; and which is reliable and durable in usage.

DESCRIPTION OF THE PREFERRED EMBODIMENT

Figure 1:
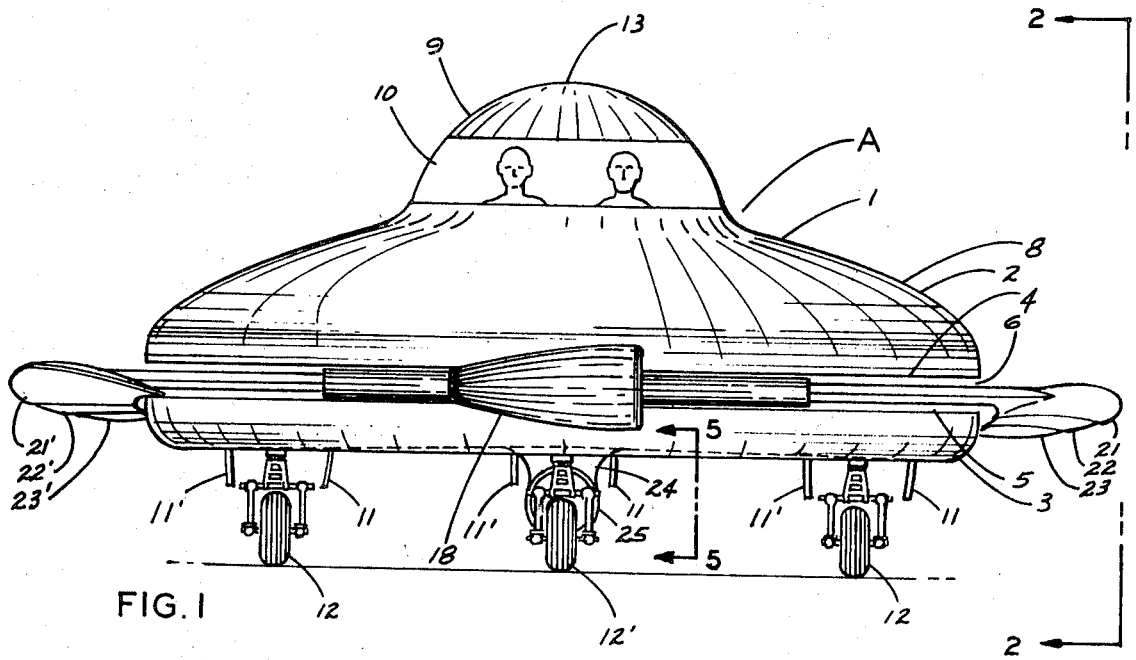
FIG. 1 is a front view of an aircraft constructed in accordance with and embodying the present invention, with the wings extended and with the aircraft supported upon its landing gear.
Figure 2:
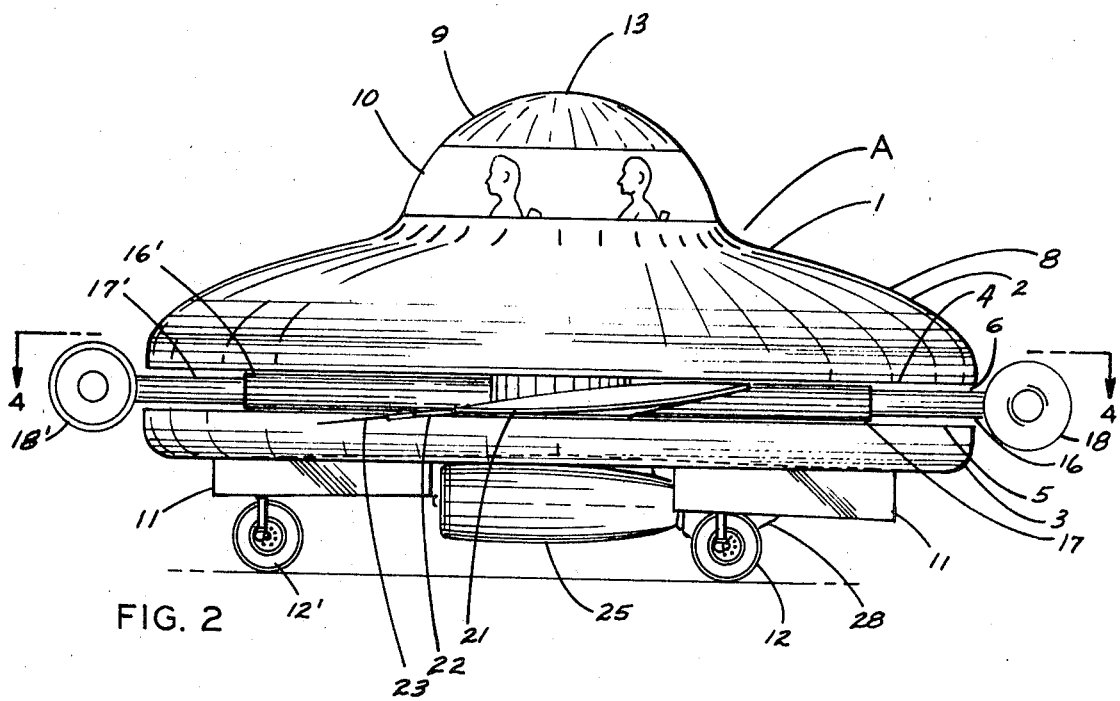
FIG. 2 is a side elevational view taken on the line 2–2 of FIGURE 1.

Referring now by reference characters to the drawings which illustrate the preferred embodiment of the present invention, A generally designates an aircraft having a fuselage 1 of relatively shallow, so-called saucerlike configuration comprising upper and lower, generally disc-shaped portions or shells 2, 3, respectively, having, respectively, lower and upper confronting, coextensive, transversely extending, annular walls 4, 5 in spaced-apart relationship to define therebetween a spacing 6 of shallow, cylindrical form and being open throughout its peripheral extent for purposes presently appearing. Said upper and lower fuselage portions 2, 3 are joined by a column 7 presented centrally of spacing 6 and suitably secured to said upper and lower portions 2, 3 for integrating the aircraft fuselage.

Figure 3:
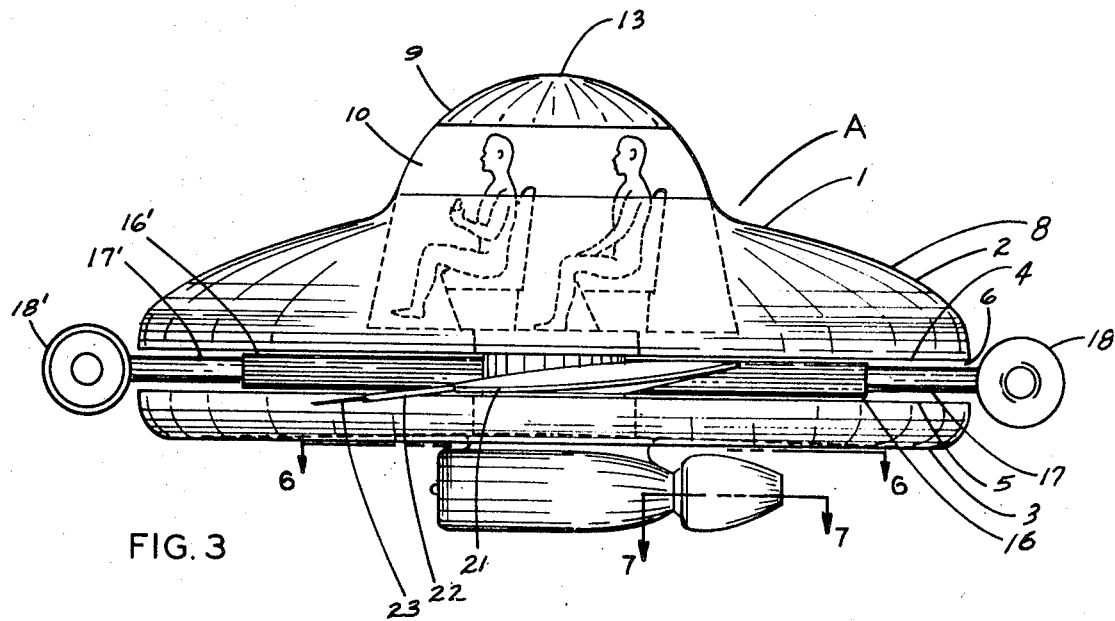
FIG. 3 is a side view illustrating the aircraft in flying condition.
Figure 5:
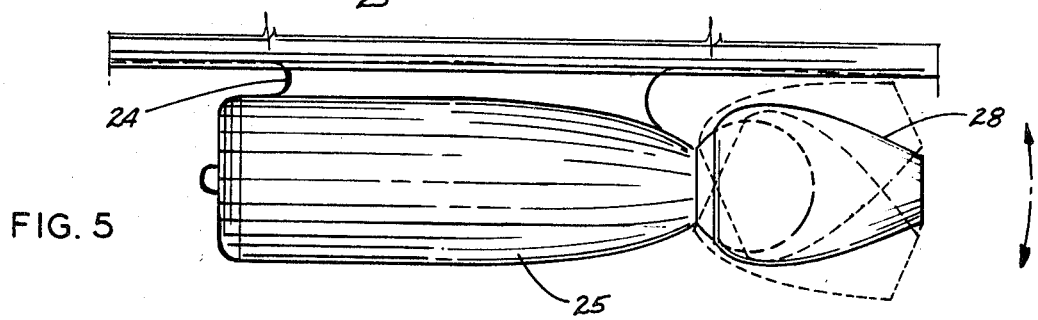
FIG. 5 is a fragmentary view taken on the line 5–5 of FIG. 1, illustrating the afterburner of the drive jet in various positions.
Figure 6:
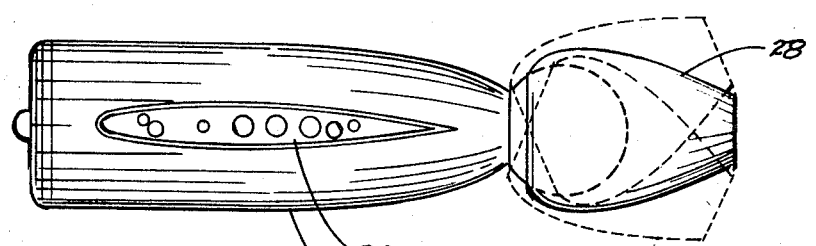
FIG. 6 is a horizontal section taken on the line 6–6 of FIG. 3.
Figure 7:
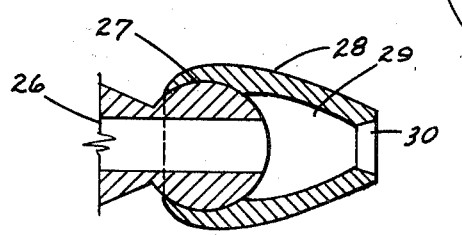
FIG. 7 is a horizontal section taken on the line 7–7 of FIG. 3.

The exterior surface of fuselage upper portion 2 is contoured to develop a camber, as indicated at 8, for providing said portion with unusual aerodynamic characteristics. Upper fuselage portion 2 merges into a central dome 9 which constitutes the exposed portion of a pilot's compartment 10; said dome being designed to permit maximum streamlining for reducing resistance to the relative and true winds. Lower fuselage portion 3 is relatively shallow having a slightly concave lower surface as in the order of one-half to five degrees but with the side of said portion being formed on a substantially same curve as the adjacent, lower section of upper fuselage portion 2. Said lower fuselage 3 in its lower end surface contains, preferably, three sets of swingably mounted doors or panels, as indicated at 11,11' for accommodating a retractable landing gear 12. It is to be observed that said sets of doors 11,11' are disposed so as to present the landing gear members 12 in conventional tricycle relationship so that the wheels of one landing gear, as at 12', will be presented normally forwardly of, and aligned with a point intermediate, the remaining two landing gear members 12,12'. Said landing gear 12 are thus capable of being withdrawn into the interior of fuselage lower portion 3 with the associated doors 11,11' being closed so as to conduce to streamlining during flight (see FIG. 3), all as is well known with current aircraft.

The diameter of upper fuselage portion 2 immediately adjacent spacing 6, or in other words, its maximum diameter, is of such extent as to be substantially equal to three times the distance between the upper face of transverse wall 5 and the apex or pinnacle of dome 9, as indicated at 13, and measured along a line coaxial with column 7. Experiments have demonstrated that such dimensional relationship conduces to maximum efficiency in operation of aircraft A so that the said relationship, or 3-to-1 ratio, is critical for optimum performance.

Mounted upon column 7 for rotative movement thereabout, by means to be described, is a bearing 14 which may be of the conventional friction-reducing type, such as a roller or ball bearing, comprehending inner and outer races (not shown) with such bearing being supplied with a suitable lubricant, all as is well known in the art. Bearing 14 constitutes the hub of a rotor, generally indicated 15, which comprises a pair of oppositely extending diametrically aligned sleeves 16, 16' being rigid at their inner ends with bearing 14 and receiving through their outer open ends support arms 17, 17' which extend beyond the margins of spacing 6 for carrying on their outer end extremities a rocket or jet-type motor 18, 18' with their burners or exhaust ends directed oppositely so that upon firing the thrust developed will create a torque for effecting rotation of rotor 15. Fuel is supplied to each motor 18, 18' through lines (not shown) extending from a reservoir or tank (not shown) located within aircraft A, preferably in lower fuselage portion 3; said lines extend through column 7, sleeves 16,16', and arms 17,17' in a manner currently accepted. Sleeves 16,16' are adapted for rotative movement about their longitudinal axes that the related motors 18, 18' may be adjustable between horizontal and vertical attitude. Control means for presenting motors 18,18' are manipulatable from remote mechanisms within the pilot's compartment 10. Although the drawings would indicate that the maximum cross section of motors 18, 18' is greater than the height of spacing 6 so that seemingly retraction of said motors 18,18' thereinto would not be attainable, it is to be understood that appropriate alteration in such dimensional relationships is within the scope of the present invention so that such motors 18,18' could be adapted for retraction. Such feature is particularly important when aircraft A is to be used above the earth's atmosphere since in such environment, said motors, as well as wings 21, 21', will be of no purpose for vehicle propulsion.

Also be reason of the swingability of motors 18,18' the same may be utilized to continue to provide lift for aircraft A for overcoming any gravitational pull as within the upper reaches of the atmosphere.

Figure 4:
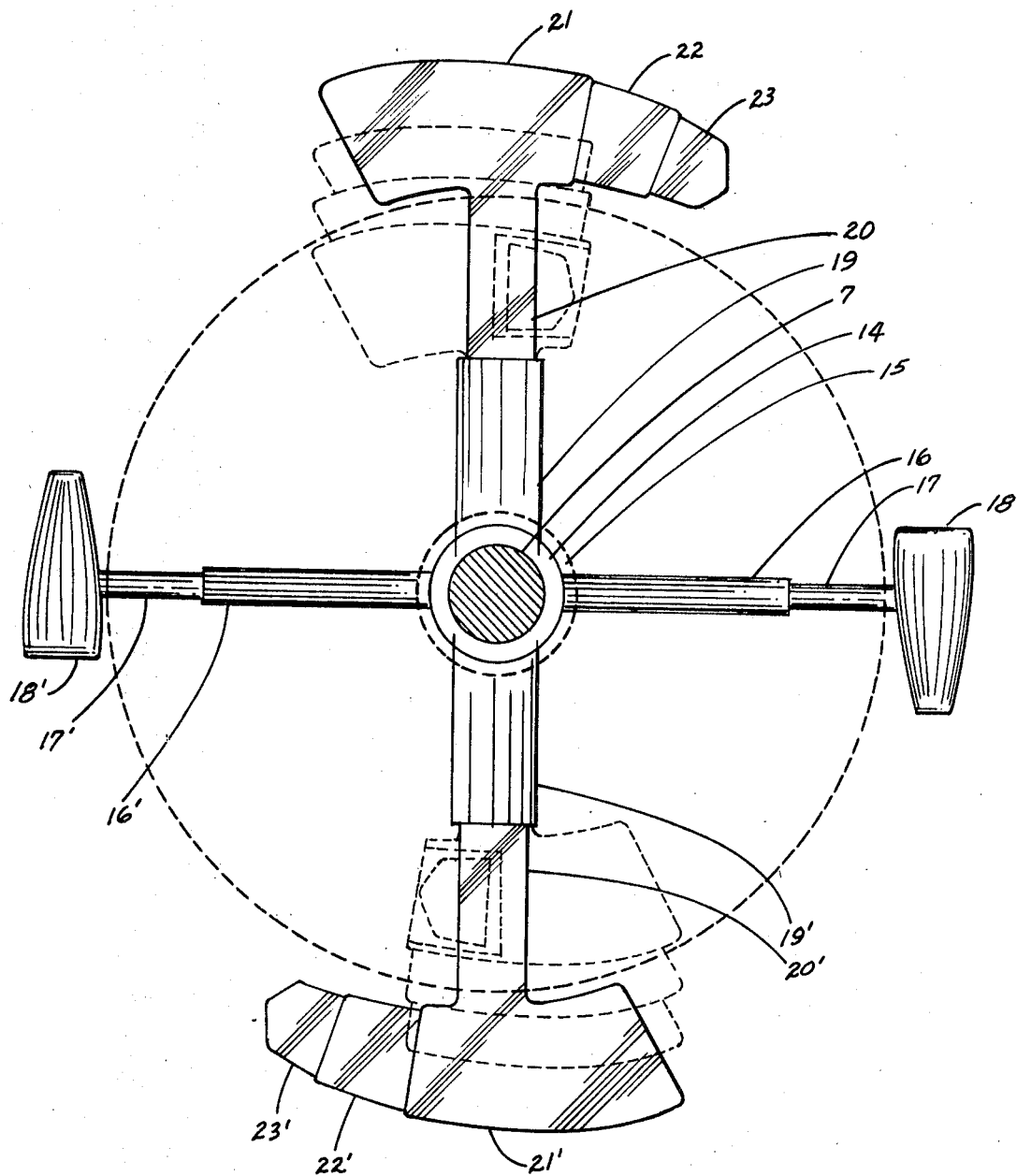
FIG. 4 is a horizontal section taken on the line 4–4 of FIG. 2.

Also integrally formed with hub 14 and extending in opposite directions therefrom along an axis normal to that developed by sleeves 16,16' are cylinders 19,19' of fluid character and each having a piston 20,20', respectively, for extension beyond its outer end which terminates spacedly inwardly of the outer margin of spacing 6. Said pistons 20,20' are of such length that when in extended condition, project on their outer ends beyond spacing 6 and on such ends each mount wings or airfoils 21,21', respectively, having their major axis along an arc concentric with column 7. It is apparent that wings 21, 21' are of appropriate thickness so as to be received between confronting walls 4,5 of spacing 6, inwardly of the outer margin thereof when the related pistons 20,20' are retracted (as shown in phantom lines in FIG. 4). Each wing 21,21' incorporates a pair of telescopic sections 22, 23 and 22', 23', respectively, being of understandably relatively decreasing transverse extent; and which are coaxial with the related wing 21,21', serving to increase the aerodynamic surface thereof when fully extended (as shown in full lines in FIG. 4). By means known in the art, pistons 20,20' are adapted for limited rotation about their major axis so that the related wings 21,21' may be tilted for altering the angle of attack thereof. It is, of course, recognized that suitable pump mans and fluid reservoir are provided at an appropriate point within fuselage 1 for connection to cylinders 19,19' for effecting retraction and extension of pistons 20,20' as required.

Depending from the central portion of the lower end surface of lower fuselage portion 3 is a hollow mounting 24 for a single jet motor 25, the longitudinal axis of which is aligned with landing gear 12' for extension fore and aft of said aircraft A. At its rearward end, jet motor or rocket 25, surrounding its discharge passage 26, is contoured to form a ball 27 for swively mounting thereon in the nature of a ball and socket joint formation, an afterburner 28 having an interior, rearward tapering compartment 29 terminating in an outlet 30 for discharge therethrough, at the expected high velocity, of the burning rocket contents. Such discharge, in accordance with accepted practice, causes a forward thrust to be imparted to the aircraft A thereby constituting reaction propulsion. However, by reason of the swivel mounting of afterburner 28, the direction of discharge through outlet 30 may be altered in a substantial range so that the reaction force will be in a correspondingly opposite direction thereby serving to control the direction of movement of aircraft A in horizontal flight. Means for operating afterburner 28 for commensurately moving same to effect travel along the desired course, is provided within aircraft A for facile manipulation by the pilot.

In view of the foregoing, it will thus be seen that aircraft A is uniquely adapted for both vertical and horizontal flight and proving efficient movement through the atmosphere by reason of the unique aerodynamic characteristics developed by the contouring of aircraft A.

Thus, with aircraft A supported upon landing gear 12 combustion of fuel within jet motors 18,18' is initiated so that thrust is developed upon discharge to thereby cause hub 14 with its related structure to rotate about the axis developed by column 7. It is understood that wings 21,21' will have been placed in extended position so as to be caused to move in a circular path about fuselage 1 and with such movement creating an area of negative pressure above said wings to impart lift of aircraft A. Upon upward travel of aircraft A the camber of fuselage 1 will conduct to extension of the negative pressure area above the fuselage upper portion 2 and compartment 10 so that maximum lift is developed. After aircraft A has reached a desired altitude, wings 21,21' may be withdrawn into spacing 6 for removal from path of travel of aircraft A in which such combustion of fuel within jet motor 25 will provide the propulsive force for the horizontal travel of aircraft A. As stated above, such horizontal flight is directionally controlled by appropriate operation of afterburner 28 which is quite easily achieved.

It should be understood, however, that landing gear 12 may be optionally used since aircraft A may rise vertically from the ground without the need of any runway and may also be maneuvered for landing without extension of the landing gear. The same are accordingly provided for operation at the election of the pilot.

In view of the foregoing, it is to be seen that the pilot, through requisite control of jet motors 18,18' may effect corresponding control of wings 21,21' so as to have a most fine range of adjustments suitable for takeoff, flight and landing.

Having thus described my invention, what I claim and hope to obtain by Letters Patent is:

1. An aircraft comprising a fuselage having a discrete upper portion and a discrete lower portion, said upper and lower portions having spaced-apart, parallel, confronting walls to define an intervening space; said spacing being open to the atmosphere throughout its peripheral extent; a column provided centrally of said spacing connecting said upper and lower fuselage portions; bearing means provided surroundingly of said column in the region of said spacing; a pair of diametrically opposed fluid cylinders connected to and extending radially outwardly of said bearing means; a piston received within each cylinder; means for effecting extension and retraction of said piston; airfoil lift-producing means operatively connected to the cylinder remote end of each piston; said piston having a length so that upon extension of said airfoil lifting means are positioned outwardly of the peripheral spacing opening beyond said fuselage, and upon retraction, are received inwardly of the peripheral spacing opening between said fuselage upper and lower confronting walls; a pair of diametrically opposed sleeves connected to and extending radially outwardly of said bearing means in circumferentially spaced relationship with said fluid cylinders; a support arm received within each sleeve; means for effecting extension and retraction of said support arm within said sleeve; propulsion means mounted on the sleeve remote end of said support arms for effecting rotation of said airfoil lift-producing means; each of said support arms having a length so that upon extension said propulsion means are positioned outwardly of the peripheral opening of said spacing beyond said fuselage and, upon retraction, are received within said spacing between said fuselage confronting walls.

2. An aircraft as defined in claim 1, and further characterized by said confronting walls of said upper and lower fuselage portions having a diameter substantially three times the distance between the wall of said lower fuselage portion and the uppermost point of said upper fuselage portion.